(12) United States Patent
Lin et al.

(10) Patent No.: US 12,425,732 B2
(45) Date of Patent: Sep. 23, 2025

(54) MOTION TRAJECTORY DETERMINATION AND TIME-LAPSE PHOTOGRAPHY METHODS, DEVICE, AND MACHINE-READABLE STORAGE MEDIUM

(71) Applicant: SZ DJI TECHNOLOGY CO., LTD., Shenzhen (CN)

(72) Inventors: Ronghua Lin, Shenzhen (CN); Tie Su, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 616 days.

(21) Appl. No.: 17/011,570

(22) Filed: Sep. 3, 2020

(65) Prior Publication Data
US 2020/0404179 A1  Dec. 24, 2020

Related U.S. Application Data

(63) Continuation of application No. PCT/CN2018/082411, filed on Apr. 9, 2018.

(51) Int. Cl.
| | |
|---|---|
| H04N 23/68 | (2023.01) |
| G03B 17/56 | (2021.01) |
| H04N 5/783 | (2006.01) |
| B64U 20/87 | (2023.01) |
| B64U 101/30 | (2023.01) |

(52) U.S. Cl.
CPC ....... *H04N 23/6812* (2023.01); *G03B 17/561* (2013.01); *H04N 5/783* (2013.01); *H04N 23/6811* (2023.01); *B64U 20/87* (2023.01); *B64U 2101/30* (2023.01); *B64U 2201/20* (2023.01)

(58) Field of Classification Search
None
See application file for complete search history.

(56) References Cited

U.S. PATENT DOCUMENTS

| | | | |
|---|---|---|---|
| 2011/0285704 A1 | 11/2011 | Takeda et al. | |
| 2016/0360087 A1* | 12/2016 | Kwon | H04N 23/90 |
| 2017/0083027 A1* | 3/2017 | Tao | B64C 39/024 |
| 2017/0361224 A1 | 12/2017 | Takeda et al. | |
| 2017/0364077 A1* | 12/2017 | Sun | B64D 47/08 |

(Continued)

FOREIGN PATENT DOCUMENTS

| | | |
|---|---|---|
| CN | 104486543 A | 4/2015 |
| CN | 105391939 A | 3/2016 |

(Continued)

OTHER PUBLICATIONS

The World Intellectual Property Organization (WIPO) International Search Report for PCT/CN2018/082411 Jan. 4, 2019 5 pages.

*Primary Examiner* — Heather R Jones
(74) *Attorney, Agent, or Firm* — ANOVA LAW GROUP, PLLC

(57) ABSTRACT

A motion trajectory determination method includes obtaining at least one trajectory point of a gimbal that includes attitude information, obtaining, in response to receiving a trajectory point adjustment command, an actual attitude of the gimbal and adjusting the attitude information of a trajectory point to be adjusted according to the actual attitude, and determining a motion trajectory of the gimbal according to all of trajectory points of the gimbal.

19 Claims, 15 Drawing Sheets

(56) References Cited

U.S. PATENT DOCUMENTS

2018/0357478 A1* 12/2018 Schultz ............... G06F 16/5838
2019/0215457 A1*  7/2019 Enke .................. H04N 23/6812
2025/0044796 A1*  2/2025 Silva .................... G05D 1/0202

FOREIGN PATENT DOCUMENTS

| CN | 105807783 A | 7/2016 |
| CN | 105872372 A | 8/2016 |
| CN | 107454947 A | 12/2017 |

\* cited by examiner

Time-lapse photography

| Interval time | Material duration | Frame rate |
|---|---|---|
| 1s | 10s | 30fps |

Total shooting time 300s
Number of shot images 300

FIG. 4D

MOTION TRAJECTORY DETERMINATION AND TIME-LAPSE PHOTOGRAPHY METHODS, DEVICE, AND MACHINE-READABLE STORAGE MEDIUM

CROSS-REFERENCE TO RELATED APPLICATION

This application is a continuation of International Application No. PCT/CN2018/082411, filed on Apr. 9, 2018, the entire content of which is incorporated herein by reference.

TECHNICAL FIELD

The present disclosure relates to the technical field of gimbal and, more particularly, to a motion trajectory determination method and device, a time-lapse photography method and device, and a machine-readable storage medium.

BACKGROUND

A gimbal (e.g., a handheld gimbal or the like) used for fixing a shooting device (e.g., a camera, a video camera, or the like) has been widely used. Through adjustment of an attitude of the gimbal, images having different angles of view are shot by the shooting device in different attitudes. Time-lapse photography is a common shooting technique for users. Multiple images are shot using the time-lapse photography and then combined into a video. The video has an effect of reflecting a change of the scene with time, and hence, has a strong visual impact. However, the conventional gimbal does not have a good interactive design for the time-lapse photography, and thus, it is not easy to perform a time-lapse photography shooting, and the user experience is poor.

SUMMARY

In accordance with the disclosure, there is provided a motion trajectory determination method including obtaining at least one trajectory point of a gimbal that includes attitude information, obtaining, in response to receiving a trajectory point adjustment command, an actual attitude of the gimbal and adjusting the attitude information of a trajectory point to be adjusted according to the actual attitude, and determining a motion trajectory of the gimbal according to all of trajectory points of the gimbal.

Also in accordance with the disclosure, there is provided a time-lapse photography method including obtaining a motion trajectory of a gimbal that includes at least one piece of attitude information, obtaining one or more control parameters of time-lapse photography, and sending the motion trajectory and the one or more control parameters to the gimbal to enable the gimbal to control an attitude of the gimbal according to the attitude information in the motion trajectory and perform time-lapse photography according to the one or more control parameters.

Also in accordance with the disclosure, there is provided a control device including a processor and a memory storing program codes that, when being executed, cause the processor to obtain at least one trajectory point of a gimbal that includes attitude information, obtain, in response to receiving a trajectory point adjustment command, an actual attitude of the gimbal and adjust the attitude information of a trajectory point to be adjusted according to the actual attitude, and determine a motion trajectory of the gimbal using all of trajectory points of the gimbal.

BRIEF DESCRIPTION OF THE DRAWINGS

In order to provide a clearer illustration of technical solutions of disclosed embodiments, the drawings used in the description of the disclosed embodiments are briefly described below. It will be appreciated that the disclosed drawings are merely examples and other drawings conceived by those having ordinary skills in the art on the basis of the described drawings without inventive efforts should fall within the scope of the present disclosure.

FIGS. 4A to 4I are schematic diagrams of control interfaces consistent with embodiments of the disclosure.

DETAILED DESCRIPTION OF THE EMBODIMENTS

In order to provide a clearer illustration of technical solutions of disclosed embodiments, example embodiments will be described with reference to the accompanying drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure. Unless conflicting, the exemplary embodiments and features in the exemplary embodiments can be combined with each other.

The terms in the specification, claims, and the drawings of the present disclosure are merely used to illustrate embodiments of the present disclosure, instead of limiting the present disclosure. Unless otherwise defined, the terms "one," "a," "the," or the like are meant to encompass "multiple," "a plurality of," or the like. The term "and/or" used herein includes any suitable combination of one or more related items listed.

The terms "first," "second," "third," or the like in the specification, claims, and the drawings of the present disclosure are merely used to describe various information, and are not intended to limit the information. These terms are merely used to distinguish the same type of information. For example, first information may also be referred to as second information without departing from the scope of the present disclosure, and similarly, the second information may also be referred to as the first information. Depending on the context, the word "if" as used herein may be interpreted as "when," "while," or "in response to."

Figure 1:
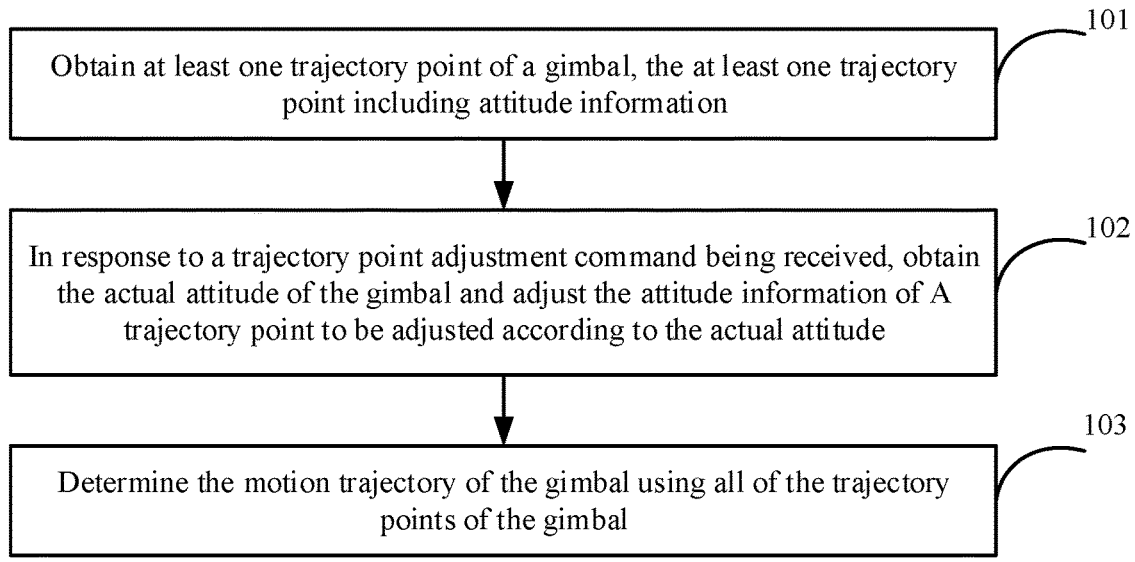
FIG. 1 is a schematic flow chart of a motion trajectory determination method consistent with embodiments of the disclosure.

The present disclosure provides a motion trajectory determination method. FIG. 1 is a schematic flow chart of an example motion trajectory determination method consistent with the disclosure. The method can be implemented by a control device. As shown in FIG. 1, at 101, at least one trajectory point of a gimbal is obtained, and the at least one trajectory point includes attitude information.

Obtaining the at least one trajectory point of the gimbal may include, but is not limited to, in response to receiving a trajectory point adding command (also simply referred to as an "adding command"), adding a new trajectory point for the gimbal, obtaining actual attitude information of the gimbal, and setting the obtained attitude information for the added new trajectory point. In some embodiments, obtaining the actual attitude information of the gimbal may include, but is not limited to, sending, by the control device, an attitude-information acquisition request to the gimbal, receiving an attitude command returned by the gimbal in response to the attitude-information acquisition request, and obtaining the actual attitude information of the gimbal from the attitude command. The attitude-information acquisition request can refer to a request for obtaining the actual attitude information of the gimbal. In some embodiments, the attitude information of the gimbal can include an actual attitude of the gimbal.

In some embodiments, obtaining the actual attitude information of the gimbal may include, but is not limited to, displaying, by the control device, a control interface to the user, the control interface including a gimbal moving button, and in response to receiving an operation command of the gimbal moving button, obtaining the actual attitude information of the gimbal. In some other embodiments, obtaining the actual attitude information of the gimbal may include, but is not limited to, displaying, by the control device, the control interface to the user, the control interface including a virtual joystick for controlling the attitude of the gimbal, and in response to receiving an operation command of the virtual joystick, obtaining the actual attitude information of the gimbal.

In some embodiments, after obtaining the at least one trajectory point of the gimbal, the control device can further display the control interface to the user, and the control interface includes a preview button of the at least one trajectory point. In response to receiving a preview command for the at least one trajectory point, the control device can control an attitude of the gimbal according to the attitude information of the at least one trajectory point.

At 102, in response to a trajectory point adjustment command (also simply referred to as an "adjustment command") being received, the actual attitude of the gimbal is obtained, and the attitude information (e.g., the attitude information at 101) of a trajectory point to be adjusted is adjusted according to the actual attitude. The trajectory point to be adjusted can refer to one of the trajectory points of the gimbal, such as one of the at least one trajectory point obtained at 101, that needs to be adjusted. Before the actual attitude of the gimbal is obtained in response to the trajectory point adjustment command being received, the control interface may be displayed to the user, and the control interface may include a adjustment button (also simply referred to as an "adjustment button"). If the user clicks the trajectory point adjustment button, the control device can receive the trajectory point adjustment command.

Obtaining the actual attitude of the gimbal may include: sending an attitude acquisition request to the gimbal, receiving the attitude command returned by the gimbal in response to the attitude acquisition request, and obtaining the actual attitude of the gimbal from the attitude command.

In some embodiments, obtaining the actual attitude of the gimbal may include, but is not limited to, displaying, by the control device, the control interface to the user, the control interface including the gimbal moving button, and in response to receiving the operation command of the gimbal moving button, obtaining the actual attitude of the gimbal. In some other embodiments, obtaining the actual attitude of the gimbal may include, but is not limited to, displaying, by the control device, the control interface to the user, the control interface including the virtual joystick for controlling the attitude of the gimbal, and in response to receiving the operation command for the virtual joystick, obtaining the actual attitude of the gimbal.

At 103, the motion trajectory of the gimbal is determined using all of the trajectory points of the gimbal. In some embodiments, after determining the motion trajectory of the gimbal using all of the trajectory points of the gimbal, the control device can further send the motion trajectory to the gimbal. The motion trajectory can be used to enable the gimbal to control the attitude of the gimbal according to the attitude information in the motion trajectory, and the controlling process will be omitted herein.

In some embodiments, the control device can obtain one or more control parameters of a time-lapse photography and send the one or more control parameters to the gimbal. The one or more control parameters can cause the gimbal to perform the time-lapse photography according to the one or more control parameters. Obtaining, by the control device, the one or more control parameters of the time-lapse photography may include, but is not limited to, displaying, by the control device, the control interface to the user and receiving the one or more control parameters input by the user on the control interface. For example, the one or more control parameters may include, but are not limited to, an interval time and/or a total shooting duration. In some other embodiments, obtaining, by the control device, the one or more control parameters of the time-lapse photography may include, but is not limited to, displaying, by the control device, the control interface to the user, receiving parameter information (e.g., a material duration and a frame rate) input by the user on the control interface, and using the parameter information to obtain the one or more control parameters of the time-lapse photography (e.g., the total shooting duration).

In some embodiments, the control device can obtain the number of shot images using the one or more control parameters. For example, the number of the shot images can be obtained using the interval time and the total shooting duration. The control device may further display the total shooting duration and/or the number of the shot images to the user. For example, the control device may display the control interface to the user, and the control interface may include the total shooting duration and/or the number of the shot images.

In some embodiments, the control device may display the control interface to the user, and the control interface may include a real-time position of a shooting device, such that the user can view the real-time position of the shooting device.

In some embodiments, the attitude information may include, but is not limited to, one of or any combination of a yaw attitude, a roll attitude, and a pitch attitude, which is not limited herein.

Consistent with the disclosure, after the at least one trajectory point of the gimbal is obtained, the actual attitude of the gimbal can be obtained, and the attitude information of the trajectory point to be adjusted can be adjusted according to the actual attitude, and thus, the attitudes that satisfy the user's needs can be obtained, and the motion trajectory can be determined according to the attitudes that satisfy the user's needs.

Figure 2A:
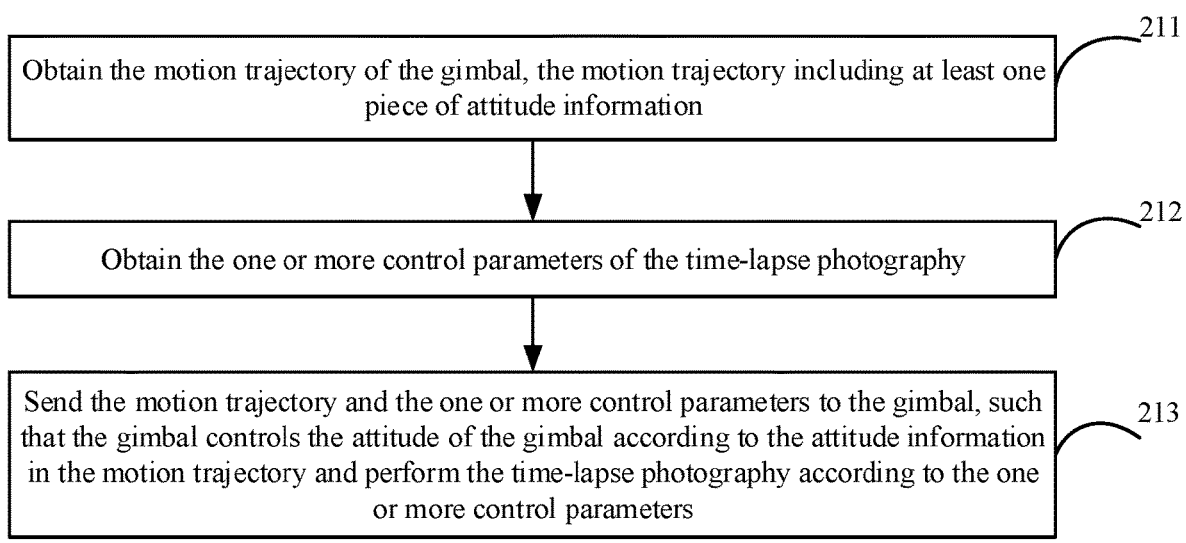
FIGS. 2A and 2B are schematic flow charts of time-lapse photography methods consistent with embodiments of the disclosure.

The present disclosure further provides a time-lapse photography method. FIG. 2A is a schematic diagram of an example time-lapse photography method consistent with the disclosure. The time-lapse photography method can be implemented by the control device. As shown in FIG. 2A, at 211, the motion trajectory of the gimbal is obtained, and the motion trajectory includes at least one piece of attitude information.

Obtaining the motion trajectory of the gimbal may include obtaining the at least one trajectory point of the gimbal, the at least one trajectory point including the attitude information, in response to the trajectory point adjustment command being received, obtaining the actual attitude of the gimbal and adjusting the attitude information of the trajectory point to be adjusted according to the actual attitude, and determining the motion trajectory of the gimbal using all of the trajectory points of the gimbal. For the specific processes, reference can be made to the processes at 101 to 103, and detailed description thereof will be omitted herein.

At 212, the one or more control parameters of the time-lapse photography are obtained. Obtain, by the control device, the one or more control parameters of the time-lapse photography may include, but is not limited to, displaying, by the control device, the control interface to the user and receiving the one or more control parameters input by the user on the control interface. For example, the one or more control parameters may include, but are not limited to, the interval time and/or the total shooting duration. In some other embodiments, obtaining, by the control device, the one or more control parameters of the time-lapse photography may include, but is not limited to, displaying, by the control device, the control interface to the user, receiving the parameter information (e.g., the material duration and the frame rate) input by the user on the control interface, and using the parameter information to obtain the one or more control parameters of the time-lapse photography (e.g., the total shooting duration).

In some embodiments, the control device can obtain the number of shot images using the one or more control parameters. For example, the number of the shot images can be obtained using the interval time and the total shooting duration. The control device may further display the total shooting duration and/or the number of the shot images to the user. For example, the control device may display the control interface to the user, and the control interface may include the total shooting duration and/or the number of the shot images.

In some embodiments, the control device may display the control interface to the user, and the control interface may include the real-time position of the shooting device, such that the user can view the real-time position of the shooting device.

At 213, the motion trajectory and the one or more control parameters are sent to the gimbal, such that the gimbal controls the attitude of the gimbal according to the attitude information in the motion trajectory and perform the time-lapse photography according to the one or more control parameters.

Figure 2B:
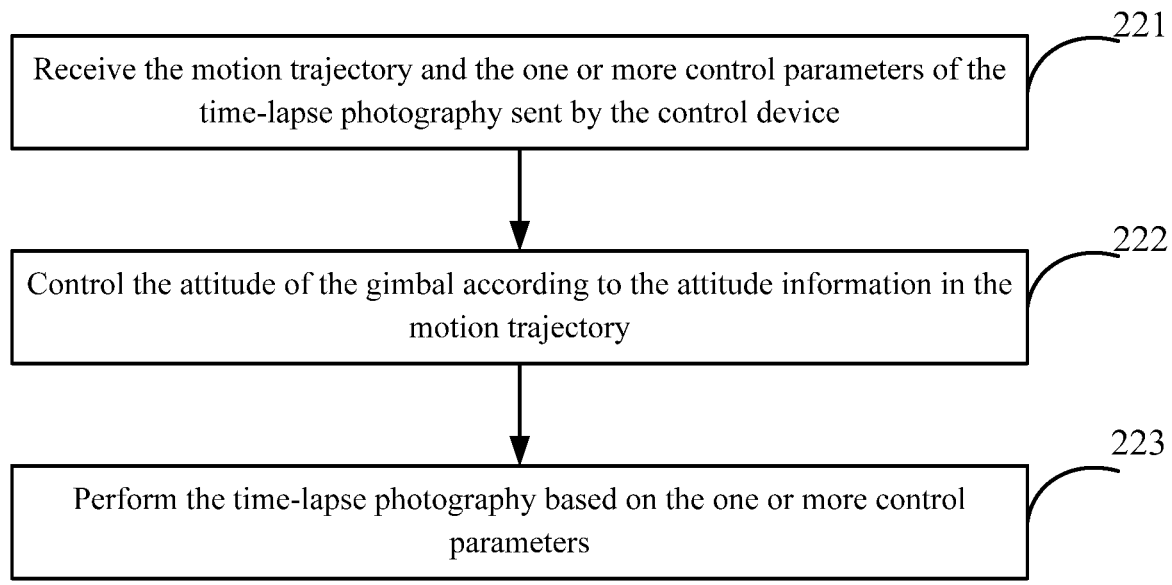

The present disclosure provides another time-lapse photography method. FIG. 2B is a schematic diagram of another example time-lapse photography method consistent with the disclosure. The time-lapse photography method can be implemented by the gimbal. As shown in FIG. 2B, at 221, the motion trajectory and the one or more control parameters of the time-lapse photography sent by the control device are received. The motion trajectory can include at least one trajectory point, and the at least one trajectory point can include the attitude information of the trajectory point.

In some embodiments, the attitude information may include one of or any combination of the yaw attitude, the roll attitude, and the pitch attitude. The one or more control parameters may include the interval time and/or the total shooting duration.

At 222, the attitude of the gimbal is controlled according to the attitude information in the motion trajectory. Controlling the attitude of the gimbal according to the attitude information in the motion trajectory may include, but is not limited to, controlling the attitude of the gimbal to sequentially pass the attitude information in the motion trajectory. For example, the attitude of the gimbal can be controlled to sequentially pass the attitude information in the motion trajectory according to a constant speed strategy, or the attitude of the gimbal can be controlled to sequentially pass the attitude information in the motion trajectory according to a pause strategy.

In some embodiments, controlling the attitude of the gimbal to sequentially pass the attitude information in the motion trajectory according to the constant speed strategy may include, but is not limited to, in response to a shutter time of the shooting device being less than a preset time threshold, the attitude of the gimbal may be controlled to sequentially pass the attitude information in the motion trajectory according to the constant speed strategy.

In some embodiments, controlling the attitude of the gimbal to sequentially pass the attitude information in the motion trajectory according to the pause strategy may include, but is not limited to, in response to the shutter time of the shooting device being greater than or equal to the preset time threshold, the attitude of the gimbal may be controlled to sequentially pass the attitude information in the motion trajectory according to the pause strategy.

At 223, the time-lapse photography is performed based on the one or more control parameters. Performing the time-lapse photography according to the one or more control parameters may include: sending shooting commands to the shooting device according to the interval time and the total shooting duration. The shooting command can be used to cause the shooting device to shoot an image according to the shooting command. The gimbal can be connected to the shooting device through a control line, and the gimbal can send the shooting command to the shooting device through the control line. The gimbal can be connected to the shooting device using other ways, which is not limited herein. Hereinafter, the gimbal with the shooting device being connected through the control line is taken as an example.

Consistent with the disclosure, the gimbal can receive the motion trajectory and the one or more control parameters of the time-lapse photography sent by the control device, control the attitude of the gimbal according to the attitude information in the motion trajectory, and perform the time-lapse photography according to the one or more control parameters. As such, the gimbal can control the shooting device to shoot multiple images, and then combine the multiple images into a video to obtain a time-lapse photography video, such that the user can conveniently operate the time-lapse photography, thereby improving the user experience.

Figure 3A:
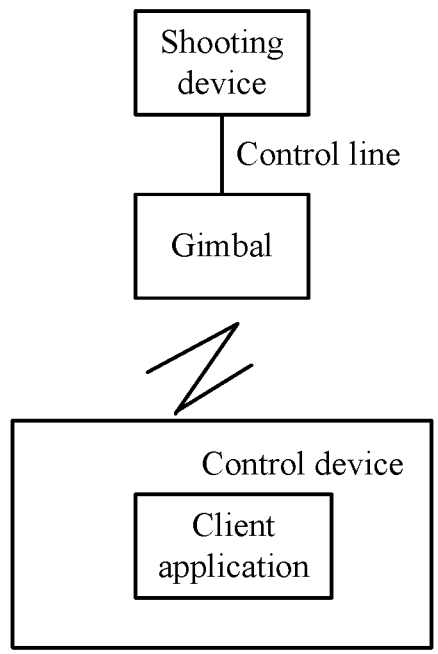
FIGS. 3A to 3C are schematic diagrams of application scenarios consistent with embodiments of the disclosure.

FIG. 3A is a schematic diagram of an example application scenario of the disclosed methods consistent with the disclosure. The application scenario includes the gimbal, the control device, and the shooting device, and the control device is provided with a client application (e.g., an APP) that can communicate with the gimbal.

The control device can communicate with the gimbal, and a connection between them can include a wired connection or a wireless connection, which is not limited herein. FIG. 3A takes the wireless connection (e.g., a WiFi, OcuSync, Lightbridge, Auxiliary, or the like) as an example. The gimbal can communicate with the shooting device, and a connection between them can include a wired connection or a wireless connection, which is not limited herein. For example, the gimbal can be connected to the shooting device through the control line (e.g., a control line of the shooting device), and the gimbal can control the shooting device through the control line. For example, a control signal can be sent through the control line to realize the control and adjustment of the shutter and shooting parameters of the shooting device, and to automatically adjust an attitude of the shooting device.

In some embodiments, the gimbal can include a hand-held gimbal or another type of gimbal, which is not limited herein. The gimbal can include an independent gimbal, e.g., a gimbal used to carry the shooting device and not arranged at an unmanned aerial vehicle (UAV), or a gimbal arranged at the UAV, which is not limited herein.

Figure 3B:
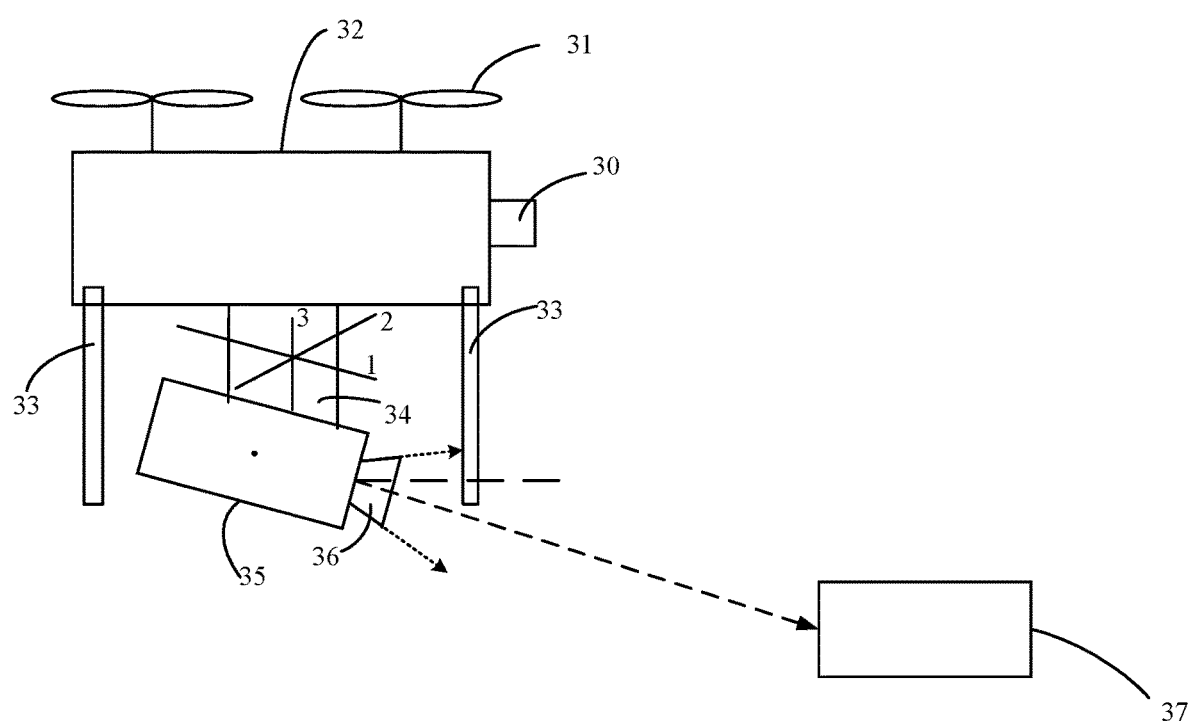

FIG. 3B is a schematic diagram of another example application scenario of the disclosed methods consistent with the disclosure. As shown in FIG. 3B, a gimbal 34 is arranged at the UAV. The reference numeral 30 denotes a nose of the UAV, the reference numeral 31 denotes a propeller of the UAV, the reference numeral 32 denotes a body of the UAV, the reference numeral 33 denotes a tripod of the UAV, the reference numeral 34 denotes the gimbal on the UAV, the reference numeral 35 denotes the shooting device carried by the gimbal 34, the reference numeral 36 denotes a shooting lens of the shooting device 35, and the reference numeral 37 denotes a target object. The shooting device 35 is connected to the body 32 of the UAV via the gimbal 34.

The gimbal 34 may include a three-axis (e.g., a roll axis, a pitch axis, a yaw axis, or the like) gimbal. That is, the gimbal 34 can rotate around the roll axis, the pitch axis, and the yaw axis of the gimbal 34. As shown in FIG. 3B, the reference numeral 1 denotes the roll axis of the gimbal 34, the reference numeral 2 denotes the pitch axis of the gimbal 34, and the reference numeral 3 denotes the yaw axis of the gimbal 34. When the gimbal 34 rotates around the roll axis 1, a roll attitude of the gimbal 34 changes. When the gimbal 34 rotates around the pitch axis 2, a pitch attitude of the gimbal changes. When the gimbal 34 rotates around the yaw axis 3, a yaw attitude of the gimbal changes. When the gimbal 34 rotates around one or more of the roll axis 1, the pitch axis 2, and the yaw axis 3, the shooting device 35 can rotate with the rotation of the gimbal 34, such that the shooting device 35 can shoot the target object 37 from different shooting directions and shooting angles. In some embodiments, the gimbal 34 can be controlled to rotate around one or more of the roll axis 1, the pitch axis 2, and the yaw axis 3.

Figure 3C:
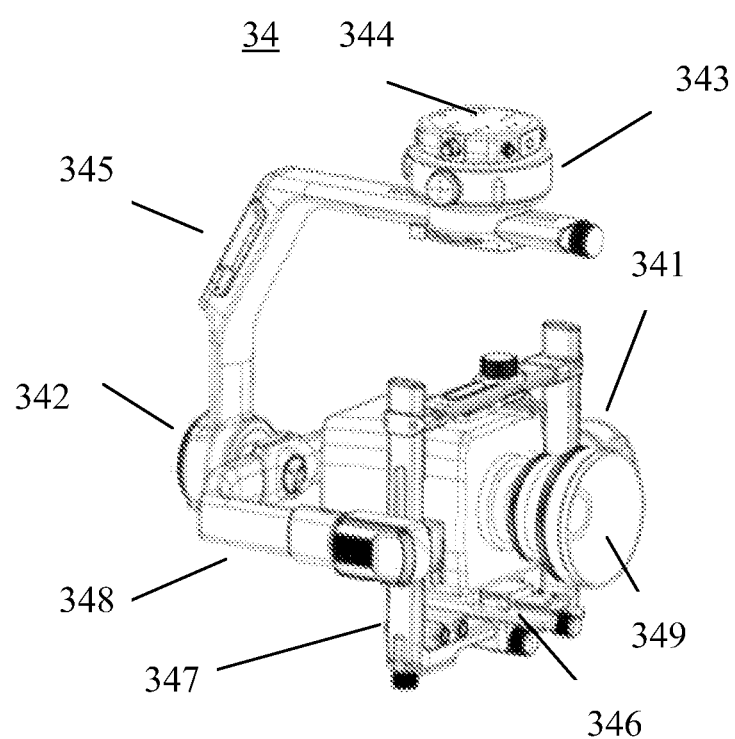

FIG. 3C is a structural diagram of an example three-axis gimbal (e.g., the gimbal 34) consistent with the disclosure. As shown in FIG. 3C, the gimbal 34 includes a pitch axis motor 341, a roll axis motor 342, a yaw axis motor 343, a gimbal base 344, a yaw axis arm 345, a fixing mechanism 346 of a shooting device 349, a pitch axis arm 347, a roll axis arm 348, the shooting device 349. The shooting device 349 can include an inertial measurement unit (IMU). In some embodiments, the IMU can be arranged at the fixing mechanism 346. A position of the IMU is not limited herein. The roll axis arm 348 can be used to support the pitch axis arm 347 and the pitch axis motor 341, the yaw axis arm 345 can be used to support the yaw axis motor 343 and the roll axis motor 342, and the pitch axis arm 347 can be used to support the shooting device 349. The pitch axis motor 341, the roll axis motor 342, and the yaw axis motor 343 (the three motors can be collectively referred to as "drive motors") can include angle sensors and circuit boards. The angle sensors can be electrically connected to the circuit boards. When the drive motors rotate, the angle sensors installed at the drive motors can measure rotation angles of the drive motors. The angle sensors can include one or more of a potentiometer, a Hall sensor, and an encoder.

In some embodiments, the gimbal can use the IMU as a feedback element and the drive motor of each axis (e.g., the yaw axis, pitch axis, and roll axis) of the gimbal as an output element to form a closed-loop control system to control the attitude of the gimbal. In the process of controlling the attitude of the gimbal, an amount of control is the attitude of the gimbal. Given a target attitude, a current attitude of the gimbal is corrected to the target attitude through feedback control, such that the gimbal can approach the target attitude from the current attitude, and finally reach the target attitude.

In some embodiments, the control device can include, but is not limited to, a remote controller, a smartphone/mobile phone, a tablet, a personal digital assistant (PDA), a laptop computer, a desktop computer, a media content player, a video game station/system, a virtual reality system, an augmented reality system, a wearable device (e.g., a watch, a glasses, a glove, a headgear, for example, a hat, a helmet, a virtual reality headset, an augmented reality headset, a head-mounted device (HMD), a headband, or the like, a pendant, an armband, a leg ring, a shoes, a vest, or the like), a gesture recognition device, a microphone, and/or any electronic device that can provide or render image data.

Figure 3D:
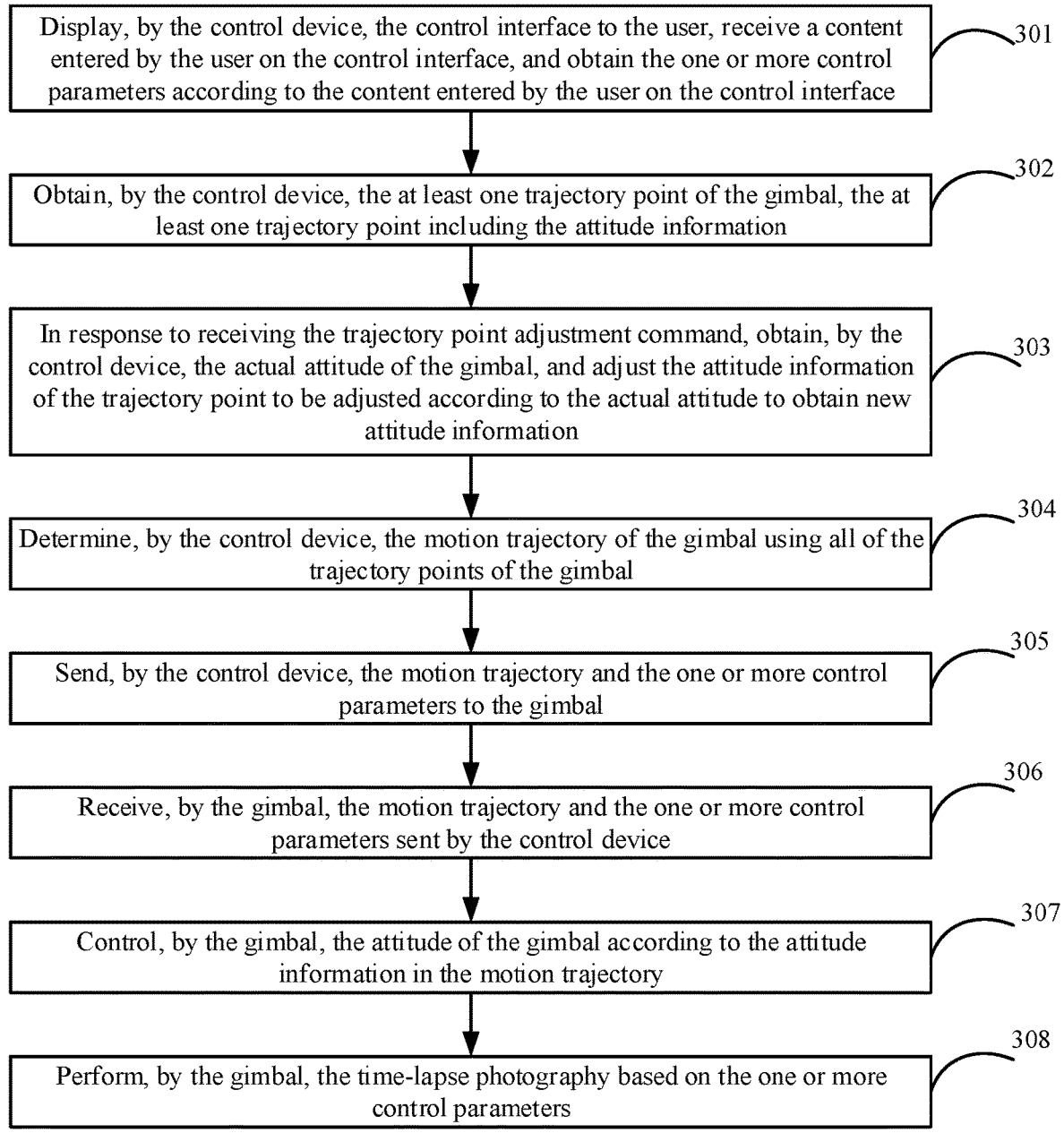
FIG. 3D is a schematic flow chart of another time-lapse photography method consistent with embodiments of the disclosure.

FIG. 3D is a schematic diagram of another time-lapse photography method consistent with the disclosure. At 301, the control device displays the control interface to the user, receives a content entered by the user on the control interface, and obtains the one or more control parameters according to the content entered by the user on the control interface. The one or more control parameters may include, but are not limited to, the interval time and/or the total shooting duration, which is not limited herein.

Figure 4A:
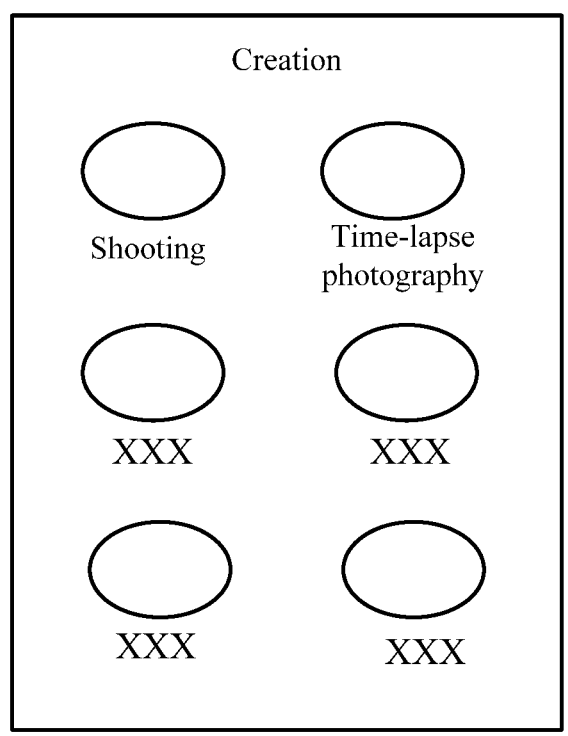
Figure 4B:
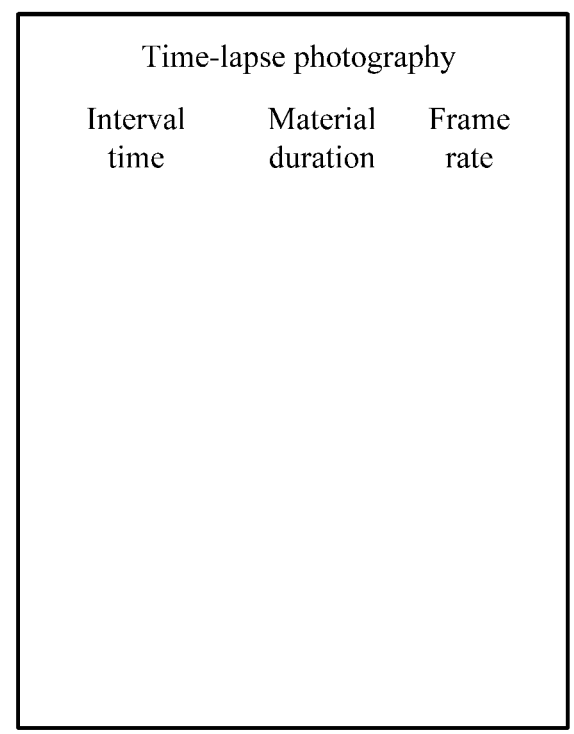
Figure 4C:
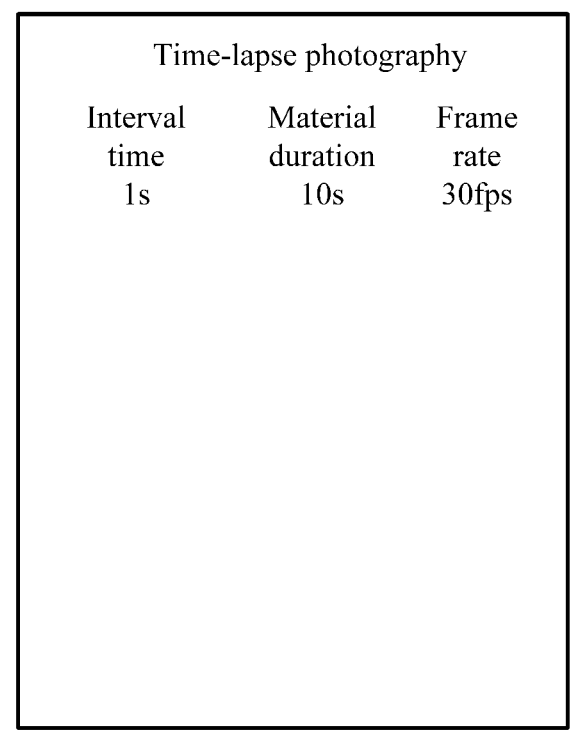

FIGS. 4A to 4I are schematic diagrams of example control interfaces consistent with the disclosure. For example, the control device can display the control interface, e.g., the control interface in FIG. 4A, to the user. The control interface in FIG. 4A includes a time-lapse photography option. When the user clicks on the time-lapse photography option, the control device can receive an operation command of the time-lapse photography and display the control interface, e.g., the control interface in FIG. 4B, to the user. The user can input the interval time, the material duration and the frame rate on the control interface shown in FIG. 4B. As shown in FIG. 4C, the control device can obtain the interval time, the material duration, and the frame rate on the control interface shown in FIG. 4C.

For the convenience of distinction, parameters consistent with the disclosure can include control parameters and parameter information. A control parameter refer to a parameter that needs to be sent to the gimbal, and parameter information refer to a parameter that does not need to be sent to the gimbal. Therefore, the interval time can be determined as a control parameter, and the material duration and the frame rate can be determined as parameter information.

FIG. 4C takes the interval time being 1 second, the material duration being 10 seconds, and the frame rate being 30 frames per second as an example. It can be appreciated that the interval time, the material duration, and the frame rate can have other values, which are not limited herein.

In some embodiments, the one or more control parameters may also include the total shooting duration. As such, the control device may use the material duration and the frame rate to obtain the total shooting duration after obtaining the material duration and the frame rate.

The interval time can be referred to as an interval for the gimbal to control the shooting device through the control line, and can represent an interval between shooting times of two adjacent images. The material duration can include a total duration of the time-lapse video, such as 10 seconds. That is, the generated time-lapse video is 10 seconds in length. The frame rate can include the frame rate of the time-lapse video, such as 30 frames per second. That is, there are 30 frames per second in the generated time-lapse video. Since the total duration of the time-lapse video is 10 seconds and the frame rate is 30 frames per second, the time-lapse video can have a total of 300 image frames (10 s×30 frames per second). Because the interval time is 1 second, shooting 300 image frames can use a total shooting time of 300 seconds (i.e., 300 frames×1 s).

The total shooting time of 300 seconds divided by the interval time of 1 second equals to 300 image frames. That is, the number of shot images is 300. The control device may further display the control interface, e.g., the control interface in FIG. 4D, to the user. As shown in FIG. 4D, the control interface may include the total shooting duration of 300 seconds and the number of shot images 300.

After the total shooting duration of 300 seconds and the number of shot images 300 are displayed to the user, if the user wishes to change the total shooting duration of 300 seconds and/or the number of shot images 300, the user can adjust the interval time, the material duration, and the frame rate. The control device can obtain the adjusted interval time, the adjusted material duration, and the adjusted frame rate, and use the adjusted interval time, the adjusted material duration, and the adjusted frame rate to obtain a new total shooting duration and a new number of shot images, and display the new total shooting duration and the new number of shot imaged to the user. The detailed description will be omitted herein.

At 302, the control device obtains the at least one trajectory point of the gimbal. The at least one trajectory point includes the attitude information, for example, the attitude information of the gimbal, e.g., the yaw attitude, the roll attitude, and the pitch attitude of the gimbal.

In some embodiments, the control device may display the control interface to the user, and the control interface may include an add button and an end button of the trajectory point. If the user needs to add a trajectory point, he/she can click the add button of the trajectory point, such that the control device can receive an add command of the trajectory point and add trajectory point 1 to the gimbal. The control device can obtain the actual attitude information of the gimbal (e.g., attitude A), and set attitude A for trajectory point 1. Similarly, the control device can add trajectory point 2 for the gimbal and set attitude B for trajectory point 2, add trajectory point 3 for the gimbal and set attitude C for trajectory point 3, add trajectory point 4 for the gimbal and set attitude D for the trajectory point 4, and add trajectory point 5 for the gimbal, and set attitude E for trajectory point 5. When the control interface is displayed again, if the user want to end the adding process, the user can click the end button of the trajectory point, such that the control device can receive an end command of the trajectory point, and obtain five trajectory points of the gimbal in total.

Figure 4E:
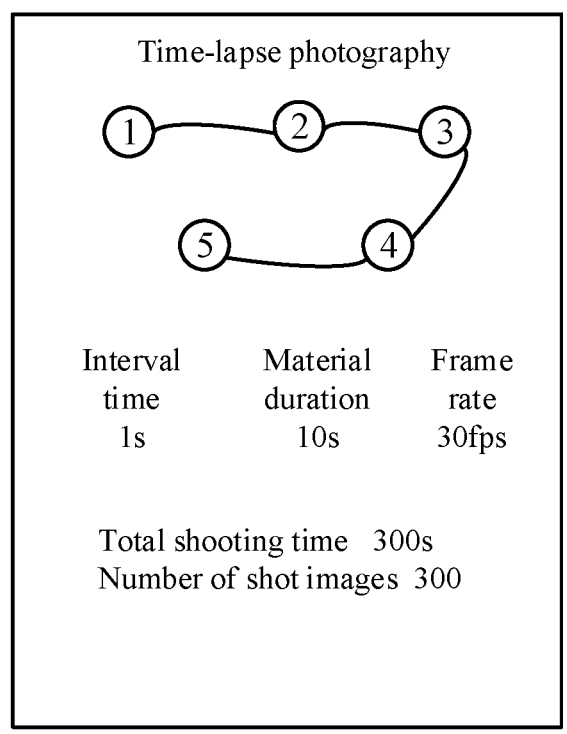

As shown in FIG. 4E, five trajectory points are shown. Attitude A of trajectory point 1 may include the yaw attitude, the roll attitude, and the pitch attitude. For the convenience of description, takes the attitude A including the roll attitude and the pitch attitude as an example. For example, the roll attitude of attitude A is 20 degrees and the pitch attitude of attitude A is 30 degrees. Attitude A can be denoted 20 degrees-30 degrees. Attitude B of trajectory point 2, attitude C of trajectory point 3, attitude D of trajectory point 4, and attitude E of trajectory point 5 are similar to attitude A of trajectory point 1, except that values of the attitudes are different, and detailed description thereof will be omitted herein.

After adding the trajectory point (e.g., trajectory point 1) to the gimbal, the control device can further obtain the attitude information of the gimbal (e.g., attitude A), and set attitude A for trajectory point 1. A process of obtaining attitude A will be described below. The process of obtaining attitude A can include, but is not limited to, the following manners.

In some embodiments, the control interface can be displayed to the user and attitude A input by the user on the control interface can be obtained. For example, the control device can display the control interface to the user, and the user can input attitude A (e.g., 20 degrees-30 degrees) on the control interface, such that the control device can obtain attitude A and set attitude A for trajectory point 1.

In some embodiments, the control interface can be displayed to the user, and the control interface can include the gimbal moving button. In response to receiving the operation command of the gimbal moving button, the control device can obtain the actual attitude information of the gimbal. The obtained actual attitude information can be used as attitude A.

After clicking the gimbal moving button, the user can move the gimbal by directly using his/her hand or using other ways to adjust the attitude of the gimbal (e.g., the yaw attitude, the roll attitude, the pitch attitude, and/or the like), such that the gimbal can be quickly rotated to the target attitude (e.g., attitude A). When the control device obtains the actual attitude information of the gimbal, the obtained actual attitude information can be the target attitude, such that the control device can obtain the attitude after the gimbal is moved. The attitude after the gimbal is moved can be used to determine the trajectory point and the trajectory point can be displayed.

Figure 4F:
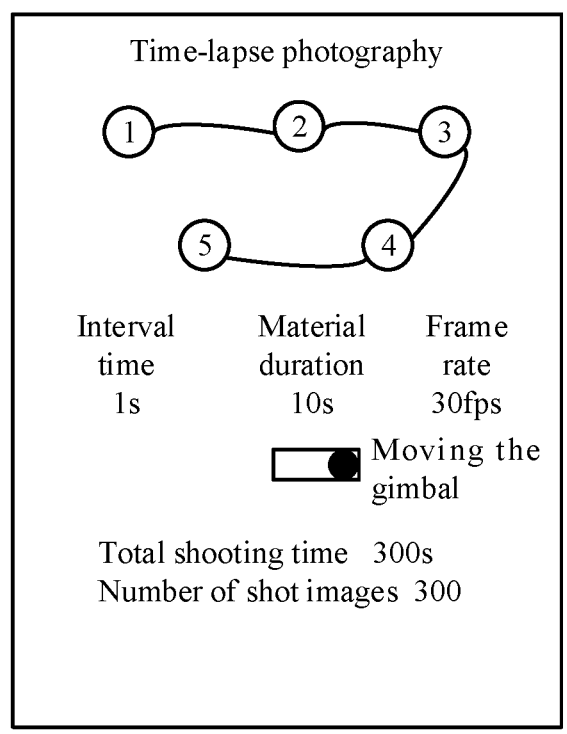

For example, the control device can display the control interface, e.g., the control interface in FIG. 4F, to the user, and the control interface in FIG. 4F includes the gimbal moving button. The user can click on the gimbal moving button, and adjust the actual attitude of the gimbal by moving the gimbal (e.g., operating the gimbal). For example, if the user wants the attitude of trajectory point 1 to be 20 degrees-30 degrees, the gimbal can be moved to 20 degrees-30 degrees. The control device can obtain the actual attitude information of the gimbal after receiving the operation command of the gimbal moving button. Since the gimbal is moved to 20 degrees-30 degrees, the actual attitude information of the gimbal can be 20 degrees-30 degrees. That is, attitude A can be 20 degrees-30 degrees. As such, the control device can obtain attitude A and set attitude A for trajectory point 1.

In some embodiments, the control interface can be displayed to the user, and the control interface can include the virtual joystick for controlling the attitude of the gimbal. In response to the user operating the virtual joystick, the control device can receive the operation command of the virtual joystick and obtain the actual attitude information of the gimbal. The obtained attitude information can be used as attitude A.

Figure 4G:
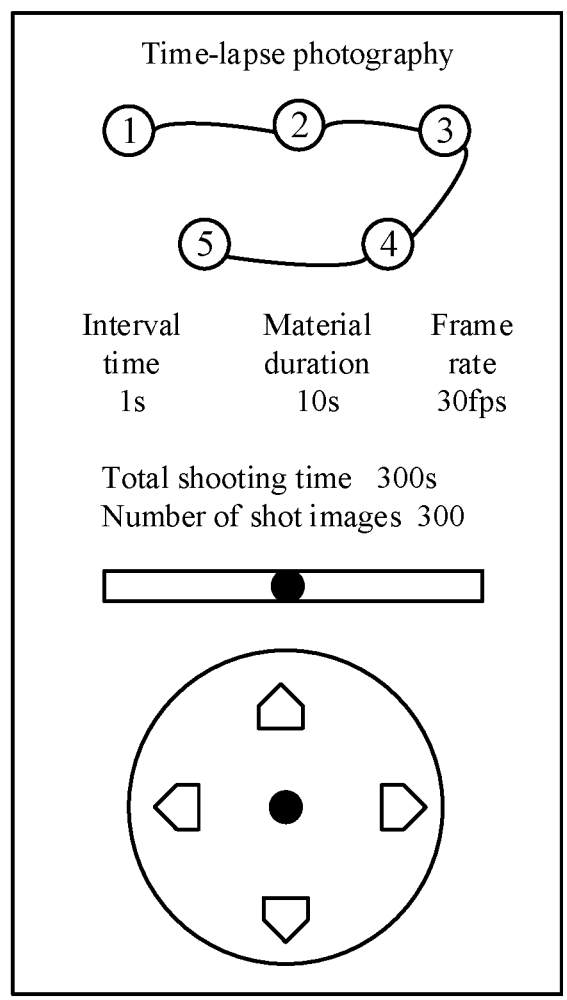

For example, the control device can display the control interface, e.g., the control interface in FIG. 4G, to the user, and the control interface in FIG. 4G includes the virtual joystick. The user can adjust the actual attitude of the gimbal by operating the virtual joystick. Assumes that the yaw attitude of the gimbal can be controlled when the virtual joystick slides left and right within a circle, the pitch attitude of the gimbal can be controlled when the virtual joystick slides up and down in the circle, and the yaw attitude of the gimbal can be controlled when the virtual joystick slides left and right within a rectangle. Therefore, if the user wants the attitude of trajectory point 1 to be 20 degrees-30 degrees, the user can slide left and right in the circle to control the roll attitude of the gimbal to be 20 degrees. As such, the roll attitude of the gimbal can be adjusted to 20 degrees. The user can slide up and down within the circle to control the pitch attitude of the gimbal to be 30 degrees. As such, the pitch attitude of the gimbal can be adjusted to 30 degrees. When the user operates the virtual joystick, the control device can receive the operation command for the virtual joystick. After receiving the operation command, the control device can obtain the actual attitude of the gimbal. Since the gimbal has been adjusted to 20 degrees-30 degrees using the virtual joystick, the actual attitude information of the gimbal can be 20 degrees-30 degrees. That is, attitude A can be 20 degrees-30 degrees. As such, the control device can obtain attitude A and set attitude A for trajectory point 1.

In order to obtain the actual attitude information of the gimbal, the control device can send the attitude-information acquisition request to the gimbal. After receiving the acquisition request, the gimbal can obtain the current actual attitude information of the gimbal and send the attitude command to the control device. The attitude command can carry the actual attitude information of the gimbal, and the control device can obtain the actual attitude information of the gimbal from the attitude command.

Therefore, attitude A can be set for trajectory point 1, and the processes of setting the attitudes for other trajectory points are similar to the processes of setting attitude A for trajectory point 1, and detailed description thereof will be omitted herein.

The disclosed embodiments described above are merely examples of obtaining the actual attitude information of the gimbal, and not intended to limit the present disclosure. For example, in addition to moving the gimbal and controlling the gimbal with the virtual joystick, a real joystick can be further used to control the attitude information of the gimbal, such that the control device can also obtain the actual attitude information of the gimbal. The implementation processes of using the real joystick are similar to the processes of using the virtual joystick, and detailed description thereof will be omitted herein.

Referring again to FIG. 3, at 303, in response to receiving the trajectory point adjustment command, the control device obtains the actual attitude of the gimbal, and adjusts the attitude information of the trajectory point to be adjusted according to the actual attitude to obtain new attitude information.

Figure 4H:
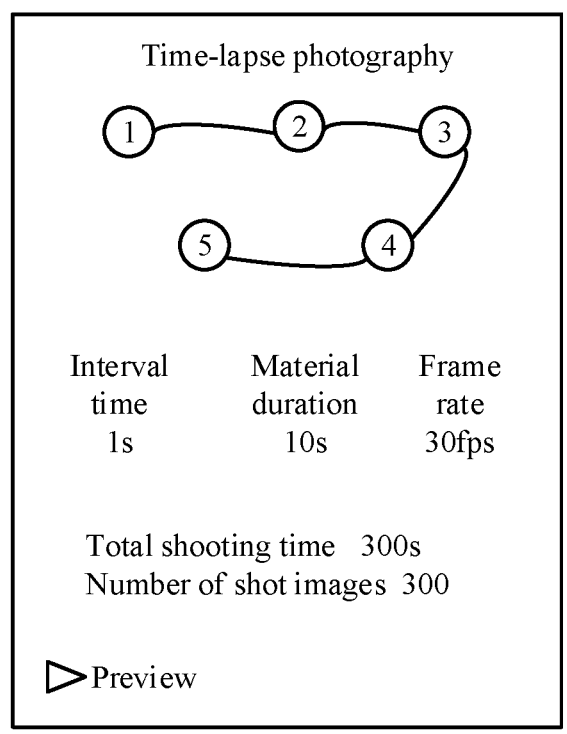

For example, after obtaining the trajectory point 1 to the trajectory point 5, the control device can also display the control interface, e.g., the control interface in FIG. 4H, to the user. The control interface in FIG. 4H includes the preview button of the at least one trajectory point. If the user clicks the preview button, the control device can receive a preview command of the preview button and control the attitude of the gimbal according to the attitude information of the trajectory point. For example, the control device can control the gimbal to move to attitude A of trajectory point 1 (e.g., 20 degrees-30 degrees), then control the gimbal to move to attitude B of trajectory point 2, then control the gimbal to move to attitude C of trajectory point 3, and then control the gimbal to move to attitude D of trajectory point 4, and then control the gimbal to move to attitude E of trajectory point 5, and then end the preview process. In some embodiments, after receiving a stop-preview command from the user, the control device can end the preview process. As another example, when the user clicks on trajectory point 2, the control device can only control the gimbal to move to attitude B of trajectory point 2, and when the user clicks on trajectory point 3, the control device can also only control the gimbal to move to attitude C of trajectory point 3.

During the preview process, the user can view the actual attitude of the gimbal in real time, and view changes of the light in different attitudes and other factors that affect a shooting effect. As such, if it is found that the actual attitude of the trajectory point can satisfy the needs of the user, the user will not adjust the attitude information of the trajectory point. If it is found that the actual attitude of the trajectory point does not satisfy the needs of the user, the user can adjust the attitude information of the trajectory point.

In some embodiments, the control device can display the control interface to the user, and the control interface can include the trajectory point adjustment button. If the user clicks the trajectory point adjustment button (for example, if the actual attitude does not satisfy the needs of the user, the user can click the adjustment button to adjust the attitude information of the trajectory point to be adjusted), the control device can receive the trajectory point adjustment command, obtain the actual attitude of the gimbal, and adjust the attitude information of the trajectory point to be adjusted according to the actual attitude to obtain the new attitude information.

For example, if the adjustment command for trajectory point 1 is received, the actual attitude of the gimbal (e.g., attitude A') can be obtained, and attitude A of trajectory point 1 can be adjusted according to attitude A'. That is, the new attitude information of trajectory point 1 is attitude A'. If the adjustment command for trajectory point 3 is received, the actual attitude C' of the gimbal can be obtained, and attitude C of the trajectory point 3 can be adjusted according to attitude C', and detailed description thereof will be omitted herein.

Obtaining, by the control device, the actual attitude of the gimbal (e.g., attitude A') may include, but is not limited to, the following manners. In some embodiments, the control interface can be displayed to the user, and attitude A' input by the user on the control interface can be received. In some embodiments, the control interface can be displayed to the user, the control interface can include the gimbal moving button. If the user clicks the gimbal moving button, the control device can receive the operation command of the gimbal moving button and obtain the actual attitude of the gimbal. The obtained actual attitude can be used as attitude A'. After the user clicks on the gimbal moving button, the user can move the gimbal by directly using his/her hand or using other ways to adjust the attitude of the gimbal, such that the gimbal can be quickly rotated to the target attitude. When the control device obtains the actual attitude information of the gimbal, the obtained actual attitude information can be the target attitude, such that the control device can obtain the attitude after the gimbal is moved. The attitude after the gimbal is moved can be used to determine the trajectory point and the trajectory point can be displayed. In some embodiments, the control interface can be displayed to the user, and the control interface can include the virtual joystick. If the user operates the virtual joystick, the control device can receive the operation command of the virtual joystick and obtain the actual attitude of the gimbal. The obtained actual attitude can be used as attitude A'.

For the control manners described above, reference can be made to the processes at 302, and detailed description thereof will be omitted herein. After obtaining actual attitude A' of the gimbal, the control device can replace attitude A of the trajectory point 1 with attitude A'.

The disclosed manners described above are merely examples of obtaining the actual attitude information of the gimbal, and not intended to limit the present disclosure. For example, in addition to moving the gimbal and controlling the gimbal with the virtual joystick, the real joystick can be further used to control the attitude information of the gimbal, such that the control device can also obtain the actual attitude information of the gimbal. The implementation processes of using the real joystick are similar to the processes of using the virtual joystick, and detailed description thereof will be omitted herein.

Figure 4I:
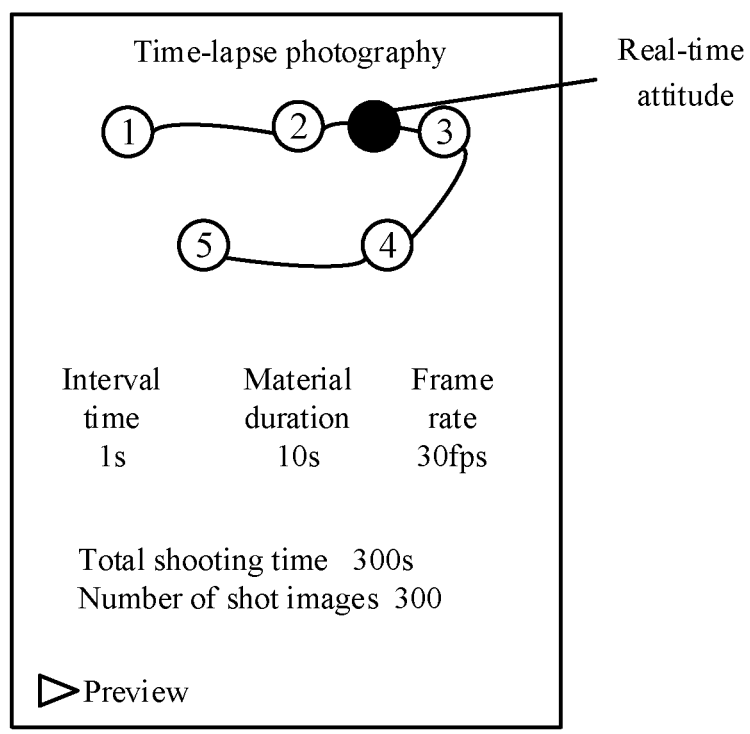

In some embodiments, the control device can display the control interface, e.g., the control interface in FIG. 4I, to the user and the control interface in FIG. 4I includes the real-time position of the shooting device, thereby allowing the user to intuitively view the real-time position of the shooting device. For example, the control interface can further display the attitude of the gimbal in real time during the preview process. When the gimbal performs the image acquisition according to the attitude information, the control interface can also display the attitude of the gimbal in real time.

Referring again to FIG. 3, at 304, the control device determines the motion trajectory of the gimbal using all of the trajectory points of the gimbal. For example, trajectory point 1, trajectory point 2, trajectory point 3, trajectory point 4, and trajectory point 5 can be determined as the motion trajectory of the gimbal. The attitude of trajectory point 1 is attitude A' (not attitude A, attitude A at 302 has been replaced by attitude A' at 303), the attitude of trajectory point 2 is attitude B, the attitude of trajectory point 3 is attitude C, and the attitude of point 4 is attitude D, and the attitude of trajectory point 5 is attitude E.

At 305, the control device sends the motion trajectory and the one or more control parameters to the gimbal.

At 306, the gimbal receives the motion trajectory and the one or more control parameters sent by the control device.

At 307, the gimbal controls the attitude of the gimbal according to the attitude information in the motion trajectory.

At 308, the gimbal performs the time-lapse photography based on the one or more control parameters.

The motion trajectory may include trajectory point 1, trajectory point 2, trajectory point 3, trajectory point 4, and trajectory point 5. The gimbal can firstly move from trajectory point 1 to trajectory point 2. When moving from trajectory point 1 to trajectory point 2, the gimbal can pass through two shooting angles corresponding to trajectory point 1 and trajectory point 2, and also pass multiple shooting angles between trajectory point 1 and trajectory point 2. The gimbal can then move from trajectory point 2 to trajectory point 3. When moving from trajectory point 2 to trajectory point 3, the gimbal can pass through two shooting angles corresponding to trajectory point 2 and trajectory point 3, and also pass multiple shooting angles between trajectory point 2 and trajectory point 3. Similarly, the gimbal can finally move to trajectory point 5.

In a process of the gimbal moving from trajectory point 1 to trajectory point 5, the attitude of the gimbal can be controlled to sequentially pass all shooting angles along the motion trajectory according to the constant speed strategy. That is, the gimbal can always move at a constant speed at every shooting angle along the motion trajectory, and thus, the attitude of the gimbal can pass all the shooting angles along the motion trajectory at the constant speed. For example, when the attitude of the gimbal passes each shooting angle at the constant speed, the gimbal can send the shooting command to the shooting device every 1 second (the interval time in the one or more control parameters) for a total of 300 times (the total shooting time in the one or more control parameters). Each time the shooting device receives the shooting command, the shooting device can shoot 1 image frame. Since the shooting device receives 300 shooting commands, it can shoot 300 image frames in total.

In the process of the gimbal moving from trajectory point 1 to trajectory point 5, the attitude of the gimbal can be controlled to sequentially pass all the shooting angles along the motion trajectory according to the pause strategy. For example, the gimbal can stay at each shooting angle along the motion trajectory for 1 second (interval time). After the gimbal stays at the shooting angle for 1 second, the gimbal can move to the next shooting angle, and send the shooting command to the shooting device. After receiving the shooting command, the shooting device can shoot 1 image frame. The gimbal can adjust the shooting angle of the gimbal every 1 second and send the shooting command to the shooting device. Therefore, the gimbal can send a total of 300 shooting commands to the shooting device, such that the shooting device can shoot 300 image frames.

After the process described above, the shooting device can shoot 300 image frames, and, a video having a duration of 10 seconds and a frame rate of 30 frames per second can be generated using the 300 image frames, thereby achieving the time-lapse photography.

If the shutter time of the shooting device is less than the preset time threshold (which can be configured based on experience and not limited herein), the shutter time of the shooting device can satisfy the needs of a uniform movement of the gimbal. Therefore, the attitude of the gimbal can be controlled to sequentially pass the attitude information in the motion trajectory according to the constant speed strategy. If the shutter time of the shooting device is greater than or equal to the preset time threshold, the shutter time of the shooting device cannot satisfy the needs of the uniform motion of the gimbal. Therefore, the attitude of the gimbal can be controlled to sequentially pass the attitude information in the motion trajectory according to the pause strategy. It can be appreciated that other strategies can also be used to control the attitude of the gimbal to sequentially pass the attitude information in the motion trajectory in practical applications, which is not limited herein.

Consistent with the disclosure, after the at least one trajectory point of the gimbal is obtained, the actual attitude of the gimbal can be obtained, and the attitude information of the trajectory point can be adjusted according to the actual attitude. Therefore, the attitude satisfying the needs of the user can be obtained, and the motion trajectory can be determined according to the attitude that satisfies the needs of the user. Furthermore, the gimbal can control the attitude of the gimbal according to the attitude information in the motion trajectory, and perform the time-lapse photography according to the one or more control parameters. As such, the gimbal can control the shooting device to shoot multiple images, and then combine the multiple images into the video to obtain the time-lapse photography video, such that the user can conveniently operate the shooting of the time-lapse photography and the user experience can be improved.

Figure 5A:
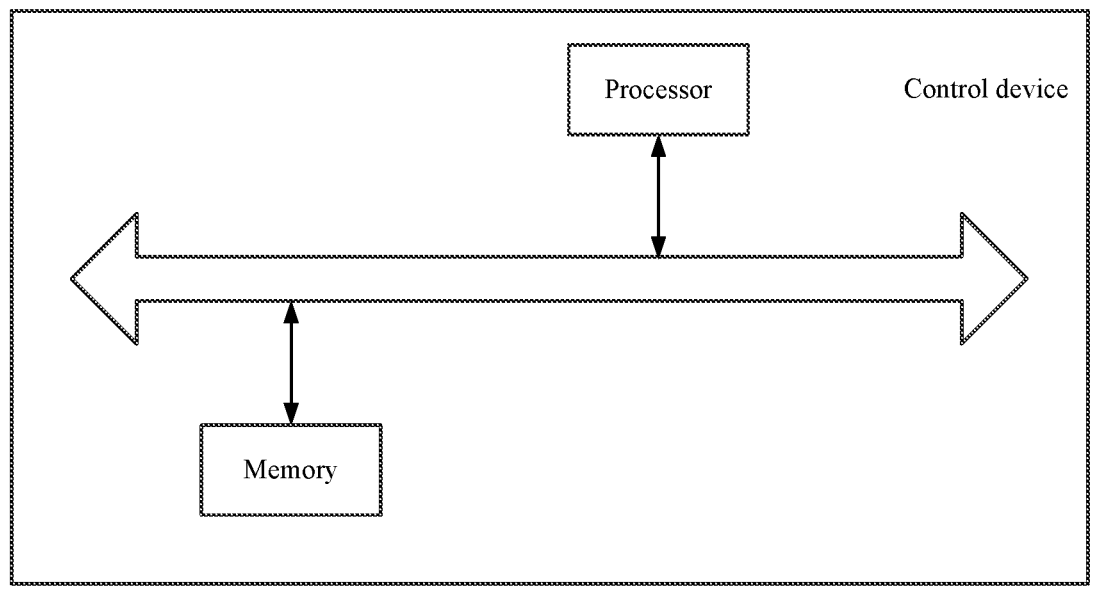
FIG. 5A is a block diagram of a control device consistent with embodiments of the disclosure.

The present disclosure further provides a control device. FIG. 5A is a block diagram of an example control device consistent with the disclosure. As shown in FIG. 5A, the control device includes a memory and a processor.

The memory can store program codes. The processor can be configured to call the program codes, and when the program codes are executed, the processor can be configured to obtain the at least one trajectory point of the gimbal, the at least one trajectory point including the attitude information, in response to receiving the trajectory point adjustment command, obtain the actual attitude of the gimbal and adjust the attitude information of the trajectory point to be adjusted according to the actual attitude, and determine the motion trajectory of the gimbal using all of the trajectory points of the gimbal.

When obtaining the at least one trajectory point of the gimbal, the processor can be configured to, in response to receiving a trajectory point adding command, add a new trajectory point for the gimbal, obtain the actual attitude information of the gimbal, and set the obtained attitude information for the added new trajectory point.

When obtaining the actual attitude information of the gimbal, the processor can be configured to display the control interface to the user, the control interface including the gimbal moving button, and in response to receiving the operation command of the gimbal moving button, obtain the actual attitude information of the gimbal. When obtaining the actual attitude information of the gimbal, the processor can be further configured to display the control interface to the user, the control interface including the virtual joystick for controlling the attitude of the gimbal, and in response to receiving the operation command of the virtual joystick, obtain the actual attitude information of the gimbal.

After obtaining the at least one trajectory point of the gimbal, the processor can be further configured to display the control interface to the user, the control interface including the preview button of the at least one trajectory point, and in response to receiving the preview command for the at least one trajectory point, control the attitude of the gimbal according to the attitude information of the at least one trajectory point.

When obtaining the actual attitude information of the gimbal, the processor can be configured to display the control interface to the user, the control interface including the gimbal moving button, and in response to receiving the operation command of the gimbal moving button, obtain the actual attitude information of the gimbal. When obtaining the actual attitude information of the gimbal, the processor can be further configured to display the control interface to the user, the control interface including the virtual joystick for controlling the attitude of the gimbal, and in response to receiving the operation command of the virtual joystick, obtain the actual attitude information of the gimbal.

After determining the motion trajectory of the gimbal using all of the trajectory points of the gimbal, the processor can be further configured to send the motion trajectory to the gimbal. The motion trajectory can be used to enable the gimbal to control the attitude of the gimbal according to the attitude information in the motion trajectory.

The processor can be further configured to obtain the one or more control parameters of the time-lapse photography and send the one or more control parameters to the gimbal. The one or more control parameters can cause the gimbal to perform the time-lapse photography according to the one or more control parameters. When obtaining the one or more control parameters of the time-lapse photography, the processor can be configured to display the control interface to the user and receive the one or more control parameters input by the user on the control interface, or display the control interface to the user, receive the parameter information input by the user on the control interface, and use the parameter information to obtain the one or more control parameters of the time-lapse photography.

The present disclosure further provides another example control device including the memory and the processor, e.g., the control device in FIG. 5A.

The memory can store the program codes. The processor can be configured to call the program codes, and when the program codes are executed, the processor can be configured to obtain the motion trajectory of the gimbal, the motion trajectory including at least one piece of attitude information, obtain the one or more control parameters of the time-lapse photography, and send the motion trajectory and the one or more control parameters to the gimbal, such that the gimbal can control the attitude of the gimbal according to the attitude information in the motion trajectory and perform the time-lapse photography according to the one or more control parameters.

When obtaining the motion trajectory of the gimbal, the processor can be configured to obtain the at least one trajectory point of the gimbal, the at least one trajectory point including the attitude information, in response to receiving the trajectory point adjustment command, obtain the actual attitude of the gimbal and adjust the attitude information of the trajectory point to be adjusted according to the actual attitude, determine the motion trajectory of the gimbal using all of the trajectory points of the gimbal.

When obtaining the one or more control parameters of the time-lapse photography, the processor can be configured to display the control interface to the user and receive the one or more control parameters input by the user on the control interface, or display the control interface to the user, receive the parameter information input by the user on the control interface, and use the parameter information to obtain the one or more control parameters of the time-lapse photography.

Figure 5B:
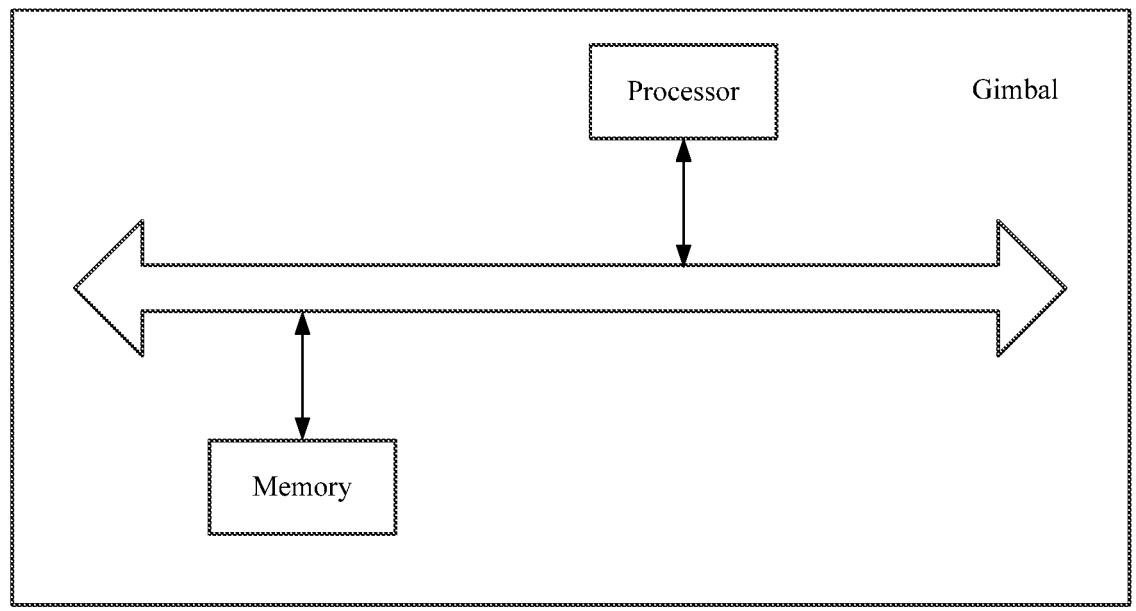
FIG. 5B is a block diagram of a gimbal consistent with embodiments of the disclosure.

The present disclosure further provides a gimbal. FIG. 5B is a block diagram of an example gimbal consistent with the disclosure. As shown in FIG. 5B, the gimbal includes a memory and a processor.

The memory can store program codes. The processor can be configured to call the program codes, and when the program codes are executed, the processor can be configured to receive the motion trajectory and the one or more control parameters sent by the control device, the motion trajectory including at least one trajectory point that includes the attitude information, control the attitude of the gimbal according to the attitude information in the motion trajectory, and perform the time-lapse photography according to the one or more control parameters.

When controlling the attitude of the gimbal according to the attitude information in the motion trajectory, the processor can be configured to control the attitude of the gimbal to sequentially pass the attitude information in the motion trajectory according to the constant speed strategy, or control the attitude of the gimbal to sequentially pass the attitude information in the motion trajectory according to the pause strategy. In some embodiments, in response to the shutter time of the shooting device being less than the preset time threshold, the attitude of the gimbal may be controlled to sequentially pass the attitude information in the motion trajectory according to the constant speed strategy. In response to the shutter time of the shooting device being greater than or equal to the preset time threshold, the attitude of the gimbal may be controlled to sequentially pass the attitude information in the motion trajectory according to the pause strategy.

The one or more control parameters can include the interval time and the total shooting duration. When performing the time-lapse photography according to the one or more control parameters, the processor can be configured to send the shooting command to the shooting device according to the interval time and the total shooting time. The shooting command can be used to cause the shooting device to shoot the image according to the shooting command.

The present disclosure further provides a machine-readable storage medium. The machine-readable storage medium can store computer instructions. When the computer instructions are executed, the motion trajectory determination method consistent with the disclosure, e.g., the method in FIG. 1, can be performed, or, when the computer instructions are executed, the time-lapse photography consistent with the disclosure, e.g., the methods in FIGS. 2 and 3, can be performed.

The systems, devices, modules, or units described in the disclosed embodiments can be implemented by computer chips or computer entities, or implemented by products having certain functions. An example implementation device can be a computer. The computer can include a personal computer, a laptop computer, a cell phone, a camera phone, a smart phone, a personal digital assistant, a media player, a navigation device, an email transceiver, a game console, a tablet computer, a wearable device, or any combination thereof.

For the simplifying of description, the disclosed device was divided into various units according to their functions and separately described. It can be appreciated that the functions of the various units can be implemented by one or multiple software and/or hardware.

It can be appreciated by those skilled in the art that the disclosed embodiments of the present disclosure may be provided as methods, systems, or computer program products. Therefore, the present disclosure can be implemented by hardware, software, or a combination thereof. The disclosed embodiments of the present disclosure may be implemented by a computer program product implemented on one or more computer-readable storage media (including, but not limited to, one or more disk storages, one or more CD-ROMs, one or more optical storages, and/or the like) storing computer-readable program codes.

The disclosed embodiments of present disclosure are described with reference to the flowcharts and/or the block diagrams of methods, devices (systems), and computer program products consistent with the disclosure. It can be appreciated that each process and/or block in the flowchart and/or block diagram, and any combination of processes and/or blocks in the flowchart and/or block diagram can be realized by computer program instructions. The computer program instructions can be provided to a processor of a general-purpose computer, a special-purpose computer, an embedded processor, or other programmable data processing device to produce a machine. The instructions executed by the processor of the computer or other programmable data processing device are caused to produce a device for implementing the functions sin one or more processes in the flowchart and/or one or more blocks in the block diagram.

These computer program instructions can also be stored in a computer-readable memory that can guide a computer or other programmable data processing device to work in a specific manner. The instructions stored in the computer-readable memory can be caused to produce an article of manufacture including the instruction device, which implements the function in one or more processes in the flowchart and/or one or more blocks in the block diagram.

These computer program instructions can also be loaded into a computer or other programmable data processing device, such that a series of operation steps can be executed on the computer or other programmable device to produce the computer-implemented processing. Thus, the instructions executed on the computer or other programmable devices can provide steps for implementing the functions in one or more processes in the flowchart and/or one or more blocks in the block diagram.

It is intended that the disclosed embodiments be considered as exemplary only and not to limit the scope of the disclosure. Changes, modifications, alterations, and variations of the above-described embodiments may be made by those skilled in the art within the scope of the disclosure.

What is claimed is:

1. A motion trajectory determination method comprising:
    obtaining at least one trajectory point of a gimbal, the at least one trajectory point including attitude information of at least one axis of the gimbal, the attitude information including at least one of a yaw attitude, a roll attitude, or a pitch attitude of the gimbal;
    in response to a user input configured to adjust an attitude of the gimbal to a target attitude, obtaining the target attitude of the gimbal and setting the target attitude of the gimbal as the attitude information of the at least one trajectory point;
    determining a motion trajectory of the gimbal according to all of trajectory points of the gimbal, the trajectory points of the motion trajectory including the at least one trajectory point, and the motion trajectory of the gimbal being a trajectory that only the attitude of the gimbal changes to sequentially pass the attitude information of all of the trajectory points; and
    displaying a control interface including the motion trajectory and a progress marker on the motion trajectory, wherein the progress marker is configured to move between the trajectory points along the motion trajectory in response to a real-time attitude of the gimbal changing, to indicate the real-time attitude of the gimbal.

2. The method of claim 1, wherein:
    obtaining the at least one trajectory point of the gimbal includes:
        in response to receiving a trajectory point adding command, adding a new trajectory point for the gimbal;
        obtaining actual attitude information of the gimbal; and
        setting the obtained attitude information for the added new trajectory point; and
    determining the motion trajectory of the gimbal includes:
        determining the motion trajectory of the gimbal further according to the new trajectory point.

3. The method of claim 1, further comprising, before obtaining the target attitude of the gimbal:

displaying a trajectory point adjustment button on the control interface, an input in the trajectory point adjustment button triggering generation of a trajectory point adjustment command.

4. The method of claim 1, wherein obtaining the target attitude of the gimbal includes:
   sending an attitude-information acquisition request to the gimbal;
   receiving an attitude command returned by the gimbal in response to the attitude-information acquisition request; and
   obtaining target attitude information of the gimbal from the attitude command.

5. The method of claim 1, wherein obtaining the target attitude of the gimbal includes:
   displaying a gimbal moving button on the control interface; and
   in response to receiving the user input on the gimbal moving button, obtaining target attitude of the gimbal, the target attitude corresponding to attitude information of the gimbal after the gimbal moves in response to the user input.

6. The method of claim 1, wherein obtaining the target attitude of the gimbal includes:
   displaying, on the control interface, a virtual joystick for controlling an attitude of the gimbal; and
   in response to receiving the user input on the virtual joystick, obtaining target attitude of the gimbal, the target attitude corresponding to attitude information of the gimbal after the gimbal moves in response to the user input.

7. The method of claim 1, further comprising, after determining the motion trajectory of the gimbal:
   sending the motion trajectory to the gimbal to enable the gimbal to control the attitude of the gimbal according to attitude information in the motion trajectory.

8. The method of claim 1, further comprising:
   obtaining one or more control parameters of time-lapse photography for the gimble at each of the trajectory points of the motion trajectory; and
   sending the one or more control parameters to the gimbal to enable the gimbal to perform time-lapse photography along the motion trajectory according to the one or more control parameters.

9. The method of claim 8, wherein obtaining the one or more control parameters includes at least one of:
   displaying the control interface and receiving the one or more control parameters input on the control interface for the gimble at each of the trajectory points of the motion trajectory; or
   displaying the control interface, receiving parameter information input on the control interface, and obtaining the one or more control parameters using the parameter information.

10. The method of claim 9, wherein the one or more control parameters include at least one of a time interval or a total shooting duration.

11. The method of claim 9, wherein:
    the parameter information includes a material duration and a frame rate; and
    the one or more control parameters include a total shooting duration.

12. The method of claim 11, further comprising:
    obtaining a number of shot images using the one or more control parameters; and
    displaying at least one of the total shooting duration or the number of the shot images.

13. The method of claim 1, further comprising:
    displaying, on the control interface, a real-time position of a shooting device at the motion trajectory.

14. The method of claim 1, further comprising:
    controlling the gimbal to adjust to the target attitude corresponding to the attitude information of the at least one trajectory point when performing the motion trajectory.

15. The method of claim 1, wherein the user input includes a user force acting on the gimbal or the shooting device carried by the gimbal.

16. The method of claim 1, further comprising, after obtaining the at least one trajectory point of the gimbal:
    displaying a preview button on the control interface; and
    in response to an operation at the preview button, controlling the gimbal to perform the motion trajectory according to the attitude information of the at least one trajectory point without controlling a shooting device carried by the gimbal to perform photography.

17. The method of claim 1, wherein:
    the trajectory points include a first trajectory point, a second trajectory point, and a third trajectory point in sequence;
    the attitude information of the trajectory points includes a first attitude of the first trajectory point, a second attitude of the second trajectory point, and a third attitude of the third trajectory point, the first attitude, the second attitude, and the third attitude being different from each other;
    the motion trajectory of the gimbal includes a trajectory that only the attitude of the gimbal changes from the first attitude to the second attitude, and changes from the second attitude to the third attitude; and
    the progress marker moves along the displayed motion trajectory of the gimbal as the attitude of the gimbal changes from the first attitude to the second attitude, and changes from the second attitude to the third attitude.

18. The method of claim 1, further comprising, after the motion trajectory of the gimbal is determined:
    in response to a shutter time of a shooting device carried by the gimbal being less than a preset time threshold, controlling the attitude of the gimbal to sequentially pass the attitude information in the motion trajectory at a constant speed; and
    in response to the shutter time of the shooting device being greater than or equal to the preset time threshold, controlling the attitude of the gimbal to sequentially pass the attitude information in the motion trajectory by staying for a preset period at each attitude of the motion trajectory.

19. A control device comprising:
    a processor; and
    a memory storing program codes that, when being executed, cause the processor to:
        obtain at least one trajectory point of a gimbal, each of the at least one trajectory point including attitude information of at least one axis of the gimbal, the attitude information including at least one of a yaw attitude, a roll attitude, or a pitch attitude of the gimbal;
        in response to receiving a user input configured to adjust an attitude of the gimbal to a target attitude, obtain the target attitude of the gimbal and setting the target attitude of the gimbal as the attitude information of the at least one trajectory point;

determine a motion trajectory of the gimbal using all of trajectory points of the gimbal, the trajectory points of the motion trajectory including the at least one trajectory point, and the motion trajectory of the gimbal being a trajectory that only the attitude of the gimbal changes to sequentially pass the attitude information of all of the trajectory points; and display a control interface including the motion trajectory and a progress marker on the motion trajectory, wherein the progress marker is configured to move among the trajectory points along the motion trajectory in response to a real-time attitude of the gimbal changing, to indicate the real-time attitude of the gimbal.

* * * * *